United States Patent [19]

Welschof et al.

[11] Patent Number: 4,835,829
[45] Date of Patent: Jun. 6, 1989

[54] HUB ASSEMBLY

[75] Inventors: Hans-Heinrich Welschof, Rodenbach; Rudolf Beier, Offenbach am Main; Norbert Hofmann, Rodgau, all of Fed. Rep. of Germany

[73] Assignee: Löhr & Bromkamp GmbH, Offenbach am Main, Fed. Rep. of Germany

[21] Appl. No.: 57,278

[22] Filed: May 29, 1987

[30] Foreign Application Priority Data

May 30, 1986 [DE] Fed. Rep. of Germany ....... 3618139

[51] Int. Cl.$^4$ ................................................. B21K 1/40
[52] U.S. Cl. ................................... 29/159.3; 219/123; 228/112; 301/105 R; 384/504; 384/544; 384/589; 464/178; 464/906
[58] Field of Search ................... 29/159.3; 301/105 R; 384/504, 544, 589; 464/178, 906; 228/112, 113, 114; 219/123

[56] References Cited

U.S. PATENT DOCUMENTS

| 4,094,376 | 6/1978 | Welschof | 301/105 R X |
| 4,150,553 | 4/1979 | Aucktor | 464/178 |
| 4,473,129 | 9/1984 | Guimbretier | 464/178 X |
| 4,536,038 | 8/1985 | Krude | 464/906 X |

FOREIGN PATENT DOCUMENTS

| 2522841 | 12/1976 | Fed. Rep. of Germany. |
| 2556177 | 6/1977 | Fed. Rep. of Germany. |
| 2556244 | 6/1977 | Fed. Rep. of Germany. |
| 3009199 | 9/1981 | Fed. Rep. of Germany. |
| 3418440 | 11/1985 | Fed. Rep. of Germany. |
| 2311668 | 12/1976 | France. |
| 2334516 | 7/1977 | France. |
| 2499910 | 8/1982 | France. |
| 2007801 | 5/1979 | United Kingdom. |

Primary Examiner—Timothy V. Eley
Assistant Examiner—Frances Chin
Attorney, Agent, or Firm—Toren, McGeady & Associates

[57] ABSTRACT

A hub assembly comprising a hub member (10), a flange (4) for wheel attachment, a double row bearing (2), and a constant velocity ratio universal joint (3), wherein the bearing has at least one inner bearing ring (13, 14) which is a separate component received on the hub member, and a connection between the hub member and a further part of the assembly is established by a welding and upsetting operation, and the inner bearing ring is engaged to hold it in position and to set the bearing as a result of such welding and upsetting operation. The welded and upset connection may be provided between the hub member and an outer member (15) of the constant velocity ratio universal joint, or between the hub member and flange. A weld bead formed by the welding and upsetting operation may engage the inner bearing ring either directly or indirectly, or a projection extending from the part welded to the hub member may engage the inner bearing ring.

34 Claims, 2 Drawing Sheets (a)

(b)

(c)

(d)

(e)

(f)

(g)

HUB ASSEMBLY

BACKGROUND TO THE INVENTION

1. Field Of The Invention

This invention relates to a hub assembly for a wheel of a motor vehicle, the assembly comprising a hub member, a double row rolling-element bearing having at least one inner bearing ring which is separate from the hub member and received thereon, and a constant velocity ratio universal joint member, connected to the hub member for driving it. More particularly, the invention relates to the holding of such separate inner bearing ring in the desired position on the hub member so that the bearing is correctly set, which may be such that the bearing is preloaded.

2. Description Of Prior Art

Hub assemblies are known wherein a simplification and reduction in the number of separate parts is achieved by having the hub member formed integrally with the universal joint member, which usually is the outer member of a constant velocity ratio universal joint. Such an integral component may further be integral with a flange member for wheel attachment, but such a construction has disadvantages with respect to the bearing. In particular, the number of rolling elements (balls or taper rollers) which may be provided in each row of the bearing is limited, so the load carrying capacity of the bearing is limited. Further, bearing size is dependent upon the size of the outer joint member, inhibiting freedom of design.

Hub assemblies are known wherein the outer joint member and the hub member are connected so as to be separable, and the row of bearing elements adjacent the joint member engages an inner bearing ring which is a separate component. The inner bearing ring for the other row of bearing elements may also be separate. Such an arrangement permits the greatest possible degree of filling, i.e. the maximum number of rolling elements, in the bearing, so that a high capacity of bearing of small dimensions is obtained. The disadvantage is that the inner bearing ring or rings have to be held on the hub member, usually in such a way that the bearing is preloaded, which typically requires the provision of further components. The arrangement can be simplified by having the bearing preloaded by whatever means connects the joint member and hub member, e.g. by having the joint member abut the adjacent inner bearing ring. Such arrangements, however, turn out to be expensive, and there is the possibility of backlash in the torque transmitting connection between the joint and hub member, and bearing failure resulting from settling of the components after assembly thereof.

In DE-3418440 a hub assembly is proposed wherein the hub member has a separate inner bearing ring secured by hot forming the hub member, the hub member being removably connected to the universal joint member. Such an arrangement still requires the provision, e.g. of interengagable teeth and a fastening bolt or bolts between the hub member and joint member, so offers no reduction in cost or complexity.

SUMMARY OF THE INVENTION

It is the object of the present invention to provide a hub assembly, for a simplification and reduction in the number of separate components, while giving the bearing a high load carrying ability and requiring little radial space. It is desirable, as far as possible, to provide independent freedom of design for the bearing and for the constant velocity ratio universal joint.

According to the one aspect of the invention, we provide a hub assembly comprising a hub member, a double row rolling-element bearing having at least one inner bearing ring which is separate from the hub member and received thereon, and a constant velocity ratio universal joint member, wherein a connection between the hub member and a further part of the assembly is established by a welding and upsetting operation, and the inner bearing ring is engaged to hold it in position and to set the bearing as a result of such welding and upsetting operation.

The inner bearing ring may be engaged, directly or through the intermediary of a spacer ring, by an annular collar which is formed by a weld bead resulting from the welding and upsetting operation. Alternatively, the inner bearing ring may be engaged by an annular projection provided on the further part welded to the hub member, the welded connection being established within said annular projection.

In a hub assembly according to the invention, it is possible to keep the diameter of the hub member, and in consequence the inner bearing diameter, smaller than the diameter of the joint member. By providing at least one separate inner bearing ring the load carrying ability of the bearing can be increased by increasing the number of bearing elements therein, and yet this advantage is achieved without having to provide elements such as tensioning bolts, and interfitting teeth on the parts connected. The weld bead is capable of providing the force necessary for holding the inner bearing ring and preloading the bearing. It is equally effective whether the weld bead acts directly or indirectly on the inner bearing ring, or whether the bearing ring is engaged by a projection on the part welded to the hub member.

In accordance with the invention, the welded connection, of course, provides a connection between the hub and the further part, which may be the adjoining universal joint member, preferably a joint outer member, or a wheel flange member. An intermediate ring, e.g. generally disc-shaped, may be connected to the hub member by the welded connection, which intermediate ring may be connected to the joint outer member by a form fitting connection for torque transmission (e.g. by axially engaging teeth), and a tensioning means such as a bolt. Such an intermediate ring may be utilised by providing it with suitably shaped outer teeth which may function as a pulse emitter cooperating with a suitable detector, e.g. to be used in an anti-lock braking system. Such construction enables the design of the bearing and universal joint to be optimised independently of one another.

Whilst the inner bearing ring adjacent the welded connection is separate from the hub member, the inner race for the row of bearing elements remote from the welded connection may be provided integrally on the hub member. However, it is also possible for the bearing to have two separate inner bearing rings, which enables more freedom in bearing design. To reduce the number of parts, the bearing may have an outer bearing ring which is integral with a mounting flange.

When an intermediate ring is provided between the joint member and hub member, it is possible for the outer diameters of the universal joint and wheel bearing approximately to correspond to each other. Interengaging teeth on the intermediate ring and joint member may be provided at a large diameter, independently of the diameter of the hub member, so that relatively small teeth can be used enabling the overall assembly to be kept at small dimensions. Backlash free torque transmission is facilitated, and good support of the bending moment arising between the joint member and hub member.

The separate inner bearing ring adjacent the welded connection may be provided, at its radially innermost edge facing the welded connection, with an annular recess which is engaged by the weld bead. This permits an axially short design.

It is also advantageous to provide the inner bearing ring and/or the hub member at the radially innermost edge of the inner bearing ring adjacent the welded connection, with an axially extending relieved portion which provides an annular clearance between the inner bearing ring and hub member, giving space for any expansion occurring during the welding operation.

Such relief should be large enough to prevent the inner bearing ring from being placed under any stress in the radial direction.

It is advantageous if at least one of the parts between which the welded connection is established is provided with a thin-walled, axially extending projection of annular cylindrical form, for forming the weld bead. This permits welding with the smallest possible heat input.

Such an axial projection provided on the hub member is advantageously of a smaller radial thickness than such a projection on the axially adjoining part to which it is welded, so that during the upsetting operation, deformation predominantly takes place at the hub member, which means that only small regions have to be deformed axially to fix the inner bearing ring. There is a further advantage in that heat dissipation takes place in the direction of the larger cross-sectional area of material, i.e. not towards the bearing.

It is additionally advantageous if the inner bearing ring adjacent the welded connection is provided with a thin-walled annular axially extending projection for engagement by the weld bead. Such projection, which may be tapered, reduces heat flow towards the bearing and renders it possible to carry out the welding operation after completion of the assembly of a sealed bearing filled with grease. This can only be achieved if the temperature in the sealing region does not exceed approximately 250 degrees C. A separate spacer ring has the same function.

The weld bead may extend over the projection of the inner bearing ring, without the latter taking part in the deformation resulting from the upsetting process. This is advantageous in reducing heating of the inner bearing ring.

Alternatively, the annular projection of the inner bearing ring may participate in the formation of the weld bead in the welding and upsetting operation. This results in a particularly close connection, and secures axial fixing of the inner bearing ring.

Although, in the embodiments above referred to, the weld bead not only ensures torque transmitting connection of the parts but at the same time engages, directly or indirectly, the inner bearing ring, it is alternatively possible for the inner bearing ring to be engaged by an annular projection provided on the further part welded to the hub member, the welded connection being established within such annular projection. Such annular projection may remain undeformed, may be elastically deformed, or may itself be subject to an upsetting operation.

The invention also provides a method of manufacturing a hub assembly comprising a hub member, a double row rolling-element bearing having at least one separate inner bearing ring received on the hub member, and a constant velocity ratio universal joint member, said method comprising connecting the hub member and a further part of the assembly by a welding and upsetting operation, and engaging said inner bearing ring as a result of such welding and upsetting operation to hold the bearing ring in position and to set the bearing.

Suitable welding processes are, for example, friction welding, butt welding or magnetic arc welding.

DESCRIPTION OF DRAWINGS

The invention will now be described by way of example with reference to the accompanying drawings of which.

DESCRIPTION OF PREFERRED EMBODIMENTS

Figure 1:
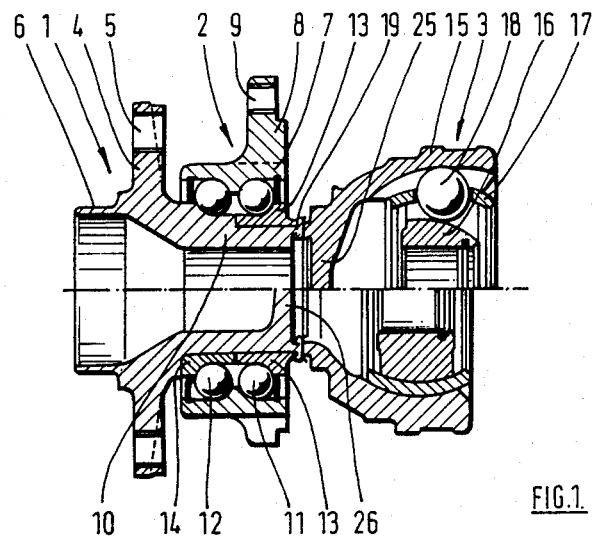
FIG. 1 is a composite longitudinal cross-section through two embodiments of hub assembly in accordance with the invention.

In the drawings, corresponding parts in the different embodiments shown have been given the same reference numerals. The hub assembly shown in FIGS. 1 to 3 comprises broadly a flange member 1, a bearing assembly 2, and a constant velocity ratio universal joint 3.

The flange member 1 has a flange portion 4 which has circumferentially distributed apertures 5 to receive fixing bolts for a wheel and/or a brake disc, and a spigot 6 extending axially outwardly. The wheel bearing 2 is a double row angular contact ball bearing having two rows of balls 11, 12, with an outer bearing race 7 integral with a mounting flange 8 with bores 9 for attachement to a suitable vehicle suspension component or components. Various different arrangements of the inner race of the bearing are described hereafter. The constant velocity ratio universal joint 3 is of known type, comprising an outer joint member 15, an inner joint member 16, a ball cage 17, and a plurality of torque transmitting balls 18.

In the upper half of FIG. 1, the wheel flange member 1 is integral with a hub member 10 which itself constitutes the inner bearing race for the row 12 of balls. The inner race for the row 11 of balls comprises a separate inner bearing ring 13 which is received on the hub member 10. The hub member 10 is open, i.e. an aperture extends axially right through it to the universal joint 3, which has a closed end 25.

The hub member 10 and outer joint member 15 are held together by a welded and upset connection 19. The bead formed thereby engages the inner bearing ring 13, to hold it in a position such that the bearing is correctly set, i.e. there is no free play in the bearing and possibly so that the bearing is preloaded.

In the lower half of FIG. 1 there is shown a bearing 2 wherein the inner races for both the rows 11, 12 of balls comprise separate inner bearing rings 13, 14 respectively, received on the exterior of the hub member 10. Once again a welded and upset connection is provided between the hub member and outer member of the constant velocity ratio universal joint, with the weld bead formed thereby serving to hold the adjacent inner bearing ring 13 such that the bearing is set. In this embodiment, the outer joint member is of open configuration and the hub member has a closure wall 26 which also serves to reinforce the hub member. If desired, the outer joint member may be closed by a suitable cover before being connected to the hub member.

Figure 2:
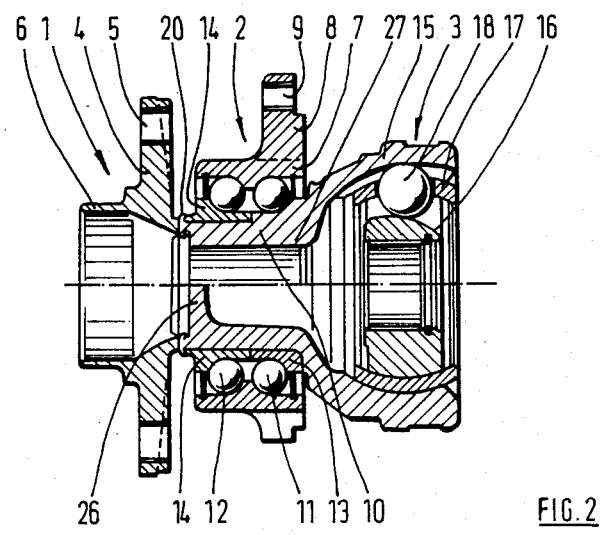
FIG. 2 is a composite longitudinal cross-section through two further embodiments of hub assembly in accordance with the invention.

Referring now to FIG. 2, this shows a further embodiment of the invention wherein the hub member 10 is integral with the universal joint outer member 15. The inner race for the row 11 of balls is formed directly on the hub member 10, whilst the inner race 14 for the row 12 of balls is a separate component. A welded and upset connection 20 is established between the hub member 10 and flange member 1, with the weld bead resulting therefrom engaging the inner bearing ring 14 to set the correct operating conditions for the bearing. Both the hub member and the outer joint member are axially open, with a sheet metal closure member or cover 27 inserted in the hub member to seal the universal joint.

The lower half of FIG. 2 shows an embodiment wherein separate inner bearing rings 13, 14 are provided for the two rows of balls of the bearing. As for the upper half of FIG. 2, the hub member and outer joint member are integral, and a welded connection is established with the flange member 1 which also sets the bearing. The end of the hub member 10 is closed and reinforced by a radially extending wall 26, which also seals the universal joint.

Figure 3:
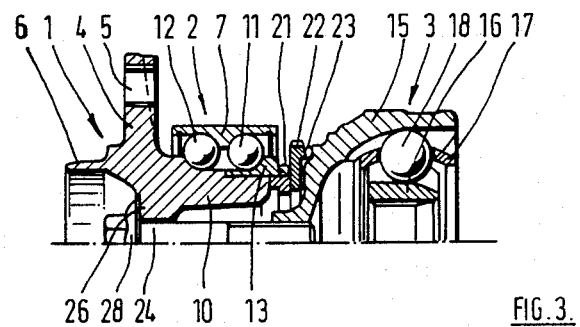
FIG. 3 is a cross-section through part of yet a further embodiment of the invention.

Referring now to FIG. 3 of the drawings, there is shown an embodiment of the invention wherein the hub member 10 and the universal joint outer member 15 are connected with the intermediary of an intermediate ring 22 which is generally in the configuration of a disc. A welded and upset connection is provided between the intermediate ring 22 and the hub member 10, the bead formed thereby engaging inner bearing ring 13 in a manner above described. The intermediate ring 22 and the outer joint member 15 have interfitting axially extending circumferentially spaced peripheral teeth 23, which interfit for torque transmission therebetween, and the outer joint member is held to the hub member by a central bolt 24 which engages a screw-threaded aperture in the outer joint member. The head of bolt 24 has a washer portion 28 which engages an abutment surface 26 at the open end of the hub member 10, so that the outer joint member is held to the hub member under an axial tension with the teeth 23 in engagement.

Figure 4:
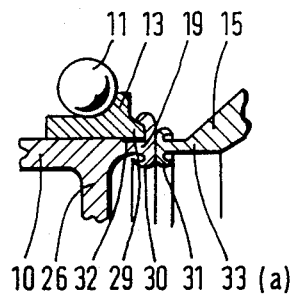
FIGS. 4a to 4f are cross-sections showing details of seven further embodiments of the invention.
Figure 4:
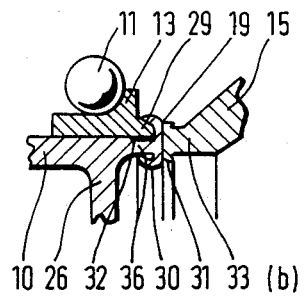
Figure 4:
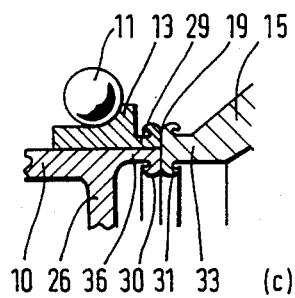
Figure 4:
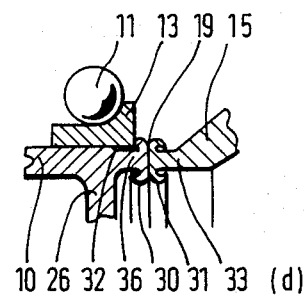
Figure 4:
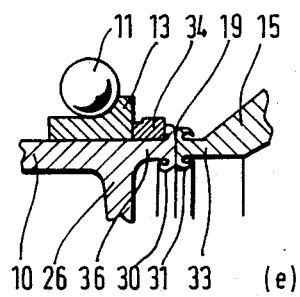
Figure 4:
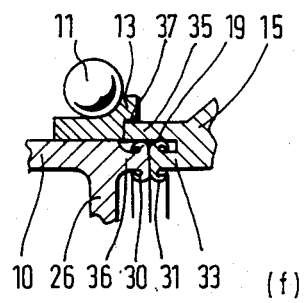
Figure 4:
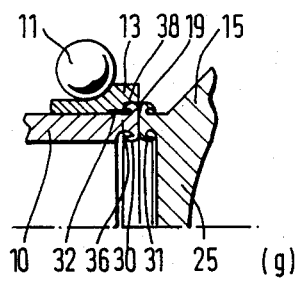

Illustrations a to e of FIG. 4 show details of parts of hub 10 with a radial reinforcing wall 26, inner bearing ring 13 for row 11 of balls, and outer joint member 15. All the modifications and details shown in FIG. 4 may be applied analogously to a welded connection between the hub member and wheel flange member.

In FIGS. 4a to 4c, the inner bearing ring 13 has been provided, adjacent the welded connection 19, with an annular projection 29 which is of tapered configuration. This is to reduce heat flow to the inner bearing ring 13 during welding. The hub member 10 has a weld bead 30 which extends across the annular projection 29, whilst the outer joint member 15 has a second weld bead 31, at the end of an annular-cylindrical projection 33 of the outer joint member. The projection 33 has relatively thin walls. Within the projection 29 of the inner bearing ring 13, hub member 10 has been provided with an axially extending relieved portion 32, so that the inner bearing ring is not put under radial stress by the formation of the weld bead.

FIG. 4b shows what is essentially the same arrangement as FIG. 4a, with the difference that the projection 33 of the outer joint member has a greater radial thickness than facing projection 36 of the hub member, so that the weld bead 31 formed thereon protrudes less.

In FIG. 4c, the projection 29 of the inner bearing ring 13 itself takes part in the establishment of the welded connection and formation of a weld bead.

FIG. 4d shows an inner bearing ring 13 with a plane end face, and weld bead 30 engaging such end face. In this embodiment, also, a relieved portion 32 is provided on annular projection 36 of the hub member 10.

FIG. 4e shows an inner bearing ring 13 the same as that of FIG. 4d, with a separate spacer ring 34 interposed between it and the weld bead 30. Such a spacer ring reduces heat flow to the inner bearing ring.

FIG. 4f shows an inner bearing ring 13 provided with an annular recess 38 in which weld bead 30 formed on projection 36 of hub member 10 engages.

In all the embodiments above described, the welded and upset connection is conveniently provided by friction welding which inherently produces weld beads of the general configurations above illustrated. However, welding techniques such as butt welding or magnetic arc welding and upsetting may be utilised.

We claim:

1. A method of manufacturing a hub assembly comprising an axially extending hub member, a double row rolling-element bearing having at least one separate inner bearing ring received on the hub member, the hub member having a radially outer surface extending rectilinearly in the axial direction at one end thereof with the at least one separate inner bearing ring located on the rectilinearly extending outer surface, a wheel flange member and a constant velocity ratio universal joint member, said method comprising connecting the hub member and either the wheel flange member or the universal joint member by a welding and upsetting operation, and enlarging radially outwardly the rectilinearly extending outer surface at the end of the hub member for engaging said inner bearing ring as a result of such welding and upsetting operation to hold the bearing ring in position and to set the bearing.

2. A method according to claim 1 wherein the welding and upsetting operation comprises friction welding.

3. A method according to claim 1 wherein the welding and operator operation comprises butt welding.

4. A method according to claim 1 wherein the welding and operator operation comprises magnetic arc welding.

5. A method according to claim 1 wherein the welding operation takes place after the constant velocity ratio universal joint has been assembled and filled with lubricant.

6. A method according to claim 1 wherein the welding operation takes place after the bearing has been assembled and filled with lubricant.

7. A hub assembly comprising a hub member, a double row rolling-element bearing having at least one inner bearing ring separate from and supported on the hub member, and a constant velocity ratio universal joint member and a wheel flange member, wherein the improvement comprises an upset welded connection between the hub member and either the wheel flange member or the universal joint member, and the connection holds and sets the inner bearing ring in position, the connection comprises an annular collar engaged to the inner bearing ring with the annular collar formed by a weld bead of the welded connection to hold and set the separate inner bearing ring by the welded connection.

8. A hub assembly according to claim 7, wherein said connection is formed between the hub member and an outer joint member of said universal joint member, and said separate inner bearing ring is provided for a row of rolling bearing elements of said bearing adjacent said universal joint member.

9. A hub assembly according to claim 8, wherein said hub member is integral with a wheel flange.

10. A hub assembly according to claim 8, wherein the outer joint member is axially open at the welded connection.

11. A hub assembly according to claim 10, wherein the outer joint member is closed by a cover of plate metal at the welded connection.

12. A hub assembly according to claim 7, wherein said connection is formed between the hub member and the wheel flange member, and said separate inner bearing ring is provided for a row of rolling bearing elements of said bearing located adjacent said wheel flange member.

13. A hub assembly according to claim 12, wherein the hub member is integral with an outer joint member of said universal joint member.

14. A hub assembly according to claim 7, wherein said connection is formed between the hub member and an intermediate ring connected to an outer joint member of said universal joint member, and the separate inner bearing ring is provided for a row of rolling bearing elements of said bearing adjacent said universal joint member.

15. A hub assembly according to claim 14, wherein the intermediate ring is generally disc-shaped and is interengaged for torque transmission with the outer joint member at a diameter greater than that of a weld bead of said connection, and means for holding said intermediate ring under axial tension relative to the outer joint member.

16. A hub assembly according to claim 15, wherein each of the intermediate ring and the outer joint member have end teeth in meshed engagement with each other.

17. A hub assembly according to claim 14, wherein the intermediate ring has a set of radially outer teeth acting as a pulse emitter for anti-blocking system.

18. A hub assembly according to claim 7, wherein the separate inner bearing ring adjacent the welded connection has an annular recess at its radially innermost edge facing the connection.

19. A hub assembly according to claim 7, wherein an annular clearance is provided between the separate inner bearing ring and the hub member adjacent the welded connection.

20. A hub assembly according to claim 7, wherein the bearing has an outer bearing ring integral with a mounting flange.

21. A hub assembly according to claim 7, wherein the bearing has two inner bearing rings each separate from the hub member.

22. A hub assembly according to claim 7, wherein at least one part of the welded connection is a thin-walled annular cylindrical projection for forming the weld bead.

23. A hub assembly according to claim 22, wherein one said thin-walled projection is located on part connected to the hub member and is of greater radial thickness than a corresponding projection provided on the hub member.

24. A hub assembly according to claim 22, wherein the inner bearing ring adjacent the welded connection has a thin-walled annular axial projection for reducing the heat flow to the bearing ring during formation of the weld bead.

25. A hub assembly according to claim 24, wherein the weld bead extends over the projection of the inner bearing ring.

26. A hub assembly according to claim 24, wherein the projection of the inner bearing ring participates in the formation of the weld bead.

27. A hub assembly according to claim 24, wherein the annular projection is deformed in the elastic range.

28. A hub assembly according to claim 22, wherein a thin-walled axially extending spacer ring is located on the hub member between the weld bead and the inner bearing ring for reducing heat flow to the bearing ring during formation of the weld bead.

29. A hub assembly according to claim 28, wherein the weld bead extends into contact with the spacer ring.

30. A hub assembly according to claim 28, wherein the spacer ring participates in the formation of the weld bead.

31. A hub assembly according to claim 7, wherein said connection is formed between the hub member and the wheel flange member, and said separate inner bearing ring is provided for a row of rolling bearing elements adjacent said wheel flange member.

32. A hub assembly according to claim 7, wherein said connection is formed between the hub member and an outer joint member of said universal joint member, and said separate inner bearing ring is provided for a row of rolling bearing elements adjacent said outer joint member.

33. A hub assembly according to claim 7, wherein the inner diameter of the inner bearing ring is smaller than the outer diameter of an outer joint member of the universal joint member.

34. A hub assembly according to claim 7, wherein the hub member is hollow and the inside of the hub member adjacent the welded connection has a radial reinforcing wall closing the hub member.

* * * * *